Patented Aug. 15, 1933

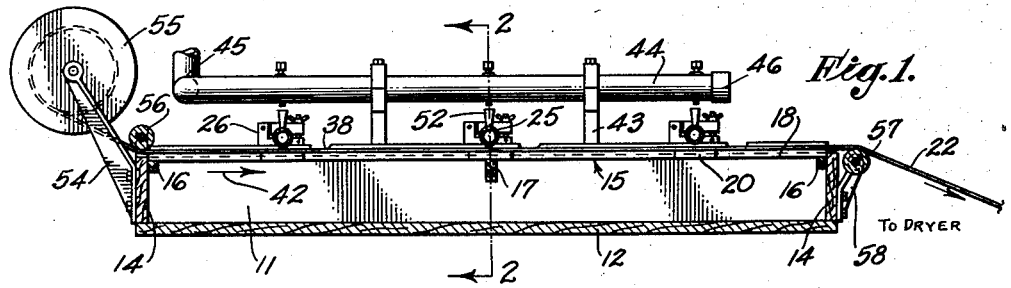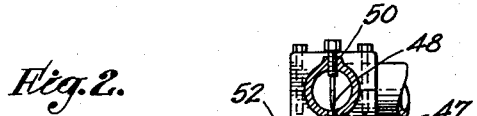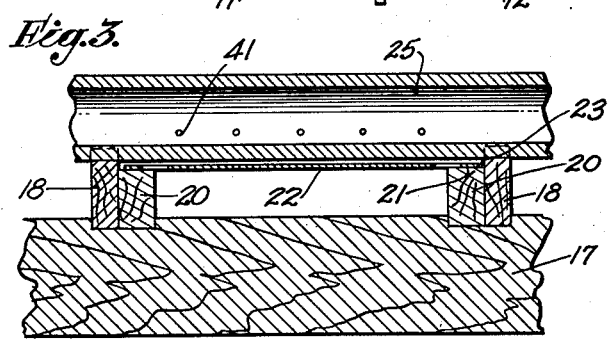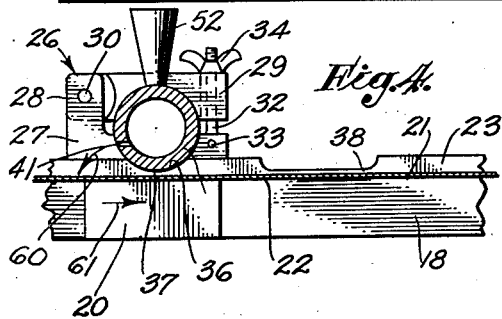

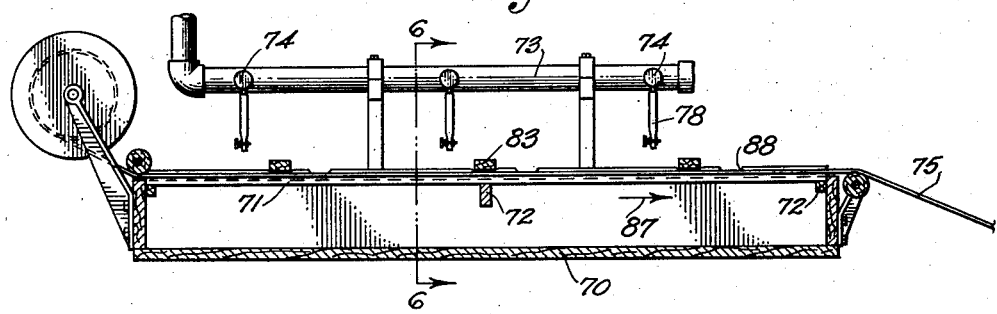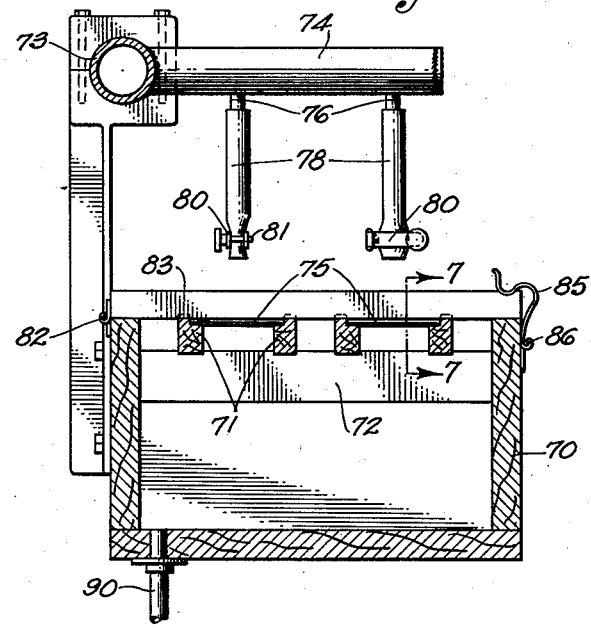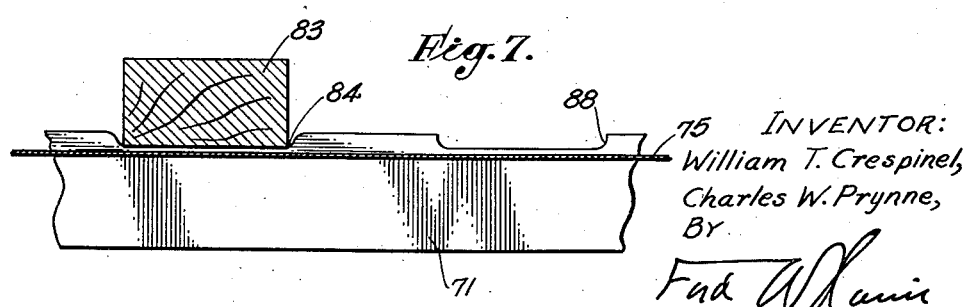

1,922,725

UNITED STATES PATENT OFFICE 1,922,725

FILM COLORING MACHINE AND METHOD OF COLORING FILM

William T. Crespinel and Charles W. Prynne, Los Angeles, Calif., assignors, by mesne assignments, to Hughes Industries Co. Ltd., a Corporation of Delaware Application March 13, 1931. Serial No. 522,380

21 Claims. (Cl. 95—94)

Our invention relates to a method of and device for applying color to motion picture films and is of especial utility in the production of colored motion pictures.

The present principal utility of our invention in the coloring of motion picture film is in the coloring of double coated positives having complementary color images in separate layers of emulsion. For the purpose of simplicity in disclosing the utility and operation of the invention, we shall describe it in conjunction with the coloring of a color value positive having color value images in emulsion coatings on the opposite sides of the supporting base or celluloid strip commonly used in motion picture film. The color value positive is obtained from complementary color value negatives which in the preferred practice respectively have orange-red and blue-green color value images recorded thereon. The emulsion on one side of a double coated film is printed from the orange-red color value negative, and the emulsion on the other side thereof is printed from the blue-green color value negative. In the subtractive method of producing colored pictures this color value positive is then transformed into a colored positive by coloring blue or blue-green the color value images printed from the orange-red color value negative, and coloring orange-red the color value images printed from the blue-green color value negative.

Our invention comprehends a simple method and means for coloring one emulsion of a double coated film without such color being applied to the other side of the film.

It is an object of our invention to provide a simple method of this character in which the film to be colored is caused to travel lengthwise in flat position or, in other words, with the base thereof coinciding with a horizontal plane, and during this travel of the film to apply a coloring solution to the upper face of the film and spread such solution in a substantially even layer over the upper face of the film, the excess of solution flowing down over the sides of the film without coloring the emulsion on the under face of the film.

A further object of the invention is to provide a simple means whereby the above method may be expediently and economically practiced.

A further object and feature of our invention is to provide at the edges of a film in flat position, as above described, means for producing a capillary attraction at the edges of the film for holding the treating or coloring fluid from flowing inwardly across the under face of the film, this contributing to practical operation of our device in coloring or treating one face of a film without any of the treating or coloring solution being applied to the frame or sound strip area on the other face of the film.

Further objects and advantages of the invention will be made evident throughout the following part of the specification.

Referring to the drawings, which are for illustrative purposes only,

Fig. 1 is a longitudinal sectional view of a preferred form of apparatus for practicing our invention.

Fig. 2 is an enlarged cross section on a plane represented by the line 2—2 of Fig. 1.

Fig. 3 is an enlarged fragmentary section also taken on the plane represented by the line 2—2 of Fig. 1.

Fig. 4 is an enlarged cross section on a plane represented by the line 4—4 of Fig. 2.

Fig. 5 is a longitudinal sectional view of an alternative form of device which may be employed in the practice of the invention.

Fig. 6 is an enlarged cross section on a plane represented by the line 6—6 of Fig. 5.

Fig. 7 is a further enlarged fragmentary section on a plane indicated by the line 7—7 of Fig. 6.

The embodiment of our invention shown in Figs. 1 to 4 includes a trough or open top tank 11 having a bottom wall 12, side walls 13, and end walls 14. In the upper portion of the trough 11 horizontal film supports 15 are supported by end cross bars 16 and a central cross bar 17. These film supports each consist of a cooperating pair of track members or longitudinal bars 18 which may be made from wood strips, and projecting block-like supports 20 are formed or provided thereon at intervals, these supports having horizontal supporting faces 21 for the edges of a film 22 spaced below the upper surfaces of the bars 18 so that adjacent the supporting faces 21 there will be side or vertical faces 23 for laterally aligning the film and causing it to move in a straight line of travel from one end of the coloring device to the other. A plurality of supporting means are provided so that a number of films 22 may be simultaneously carried through the coloring device. In this disclosure we show four supports for carrying four films, but any other number of supports may be selected in accordance with requirements. At intervals throughout the length of the device tubular members 25 are supported in horizontal, laterally extending positions across the upper edges of the track members 18 by means of clamps 26 mounted on the side walls 13 of the trough 11. These clamps each include a base portion 27 having an upwardly extending end 28 to which a swinging part 29 is hinged at 30. The swinging part is notched at its outer end to receive a swingable screw member 32 which is supported on a pin 33 carried by the base 27 and has a wing nut 34 threaded on its upper end so as to force the part 29 tightly down upon the tubular member or pipe 25. Circular depressions 36 are formed in the upper edges of the track members so that the lower face 37 of each tubular member will be spaced a distance of approximately 3/64 of an inch above the upper face of the film 22 so as to provide a spreader action which will be hereinafter described, and adjacent and following the tubular members 25 overflow notches 38 are cut in the upper edges of the track members 18 through which excess fluid may flow into the receiver provided by the trough 11.

The ends of the tubular members 25 are closed by suitable means, such as caps 40 as shown in Fig. 2, and in positions cooperating with or corresponding to the path of travel of the films 22 small discharge openings 41 are drilled in substantially evenly spaced relationship, these discharge openings being faced rearwardly or leftwardly so as to deliver streams of fluid in a direction opposite to the forward or rightward travel of the films 22 indicated by an arrow 42 in Fig. 1.

Brackets 43 mounted on one of the sides 13 of the trough 11 carry a longitudinal feed pipe 44 having a fluid receiving pipe 45 connected thereto and having the end opposite to the feed pipe 44 closed by means of a cap 46. In positions corresponding to the positions of the tubular members 25, downwardly projecting discharge nipples 47 are secured in the feed pipe 44, and flow controlling valves are formed in conjunction therewith as shown in Fig. 2 by use of valve screws 48 which are threaded downwardly through threaded openings 50 in the upper wall of the feed pipe 44 and vertically aligned with the nipples 47. These nipples 47 discharge into diagonally mounted inlet pipes 52 which are welded into the upper walls of the tubular members 25 near the ends of such tubular members, as clearly shown in Fig. 2.

A bracket 54 may be mounted at the entering end of the trough 11 in position to support film spools 55, and entering rollers 56 may be provided for guiding the films 22 initially into the horizontal channels provided by the supporting members 15. Take-off rollers 57 are preferably supported at the opposite end of the trough 11 by means of brackets 58, over which rollers the films 22 are carried forward to further treatment, such as a washing step.

As an example of the utility of our device, the coloring blue of one side of a developed double coated color value positive may be taken. This may be accomplished by moving the films 22 through the coloring device with the side which is to be colored blue faced upwardly. A controlled flow of a blue-toning solution is then delivered from the feed pipe 44 into the distributing members consisting of the tubular members 25 so that controlled flows of the solution will be delivered onto the upper face of the film, as indicated by an arrow 60 in Fig. 4. As each film 22 travels rightwardly, as indicated by an arrow 61, the solution is carried under the lower face 37 of a tubular member 25 and is spread out in a substantially even layer across the upper face of the film as a result of the lower portions of the tubular members 25 functioning as spreaders for the solution. Any excess of solution will overflow through the overflow notches 38, and a substantially even coating or layer of the solution will be retained on the top of the film and will chemically react with the silver particles forming the color value image in the emulsion on the upper face of the film so as to convert these silver particles to blue colored particles. In order to complete the color-toning action, a plurality of tubular members 25 have been provided, the number of these tubular members or distributors being selected in accordance with the strength or activity of the coloring solution employed. From the color device shown, the film is conducted into a washing liquid and then into successive steps of the particular color process employed.

The alternative form of our invention shown in Figs. 5, 6, and 7 includes a trough 70 having channel trackways 71 supported longitudinally and horizontally therein by cross members 72. In this form of the invention the means for supplying the treating solution consists of a header 73 extending down one side of the trough 70 and having branch pipes 74 extending laterally and horizontally therefrom in positions above the films 75 which are carried in the track members 71. By means of short nipples 76 projecting downwardly from the branch pipes 74, rubber tubes 78 are suspended in positions over the films 75. The flow of solution through each of the tubes 78 is controlled by pinch clips 80 of the type having screws 81 for determining the extent of deformation of the rubber tubes 78. Hinged at the back of the trough 70 by means of hinges 82 are spreader bars 83 which extend across the track members 71 and rest in notches 84 formed in the upper edges of the track members 71 so that the lower faces of the spreader bars 83 will be close to the upper faces of the films 75, as shown in Fig. 7. Spring latches 85 may be hinged at 86, as shown in Fig. 6, to the front of the trough 70 in position for engagement with the front ends of the spreader bars 83. As clearly shown in Fig. 5, the tubes 78 precede the spreader bars when the films 75 are traveling in rightward or forward direction, as indicated by an arrow 87. The streams of fluid discharged onto the upper faces of the films 75 pass under the spreader bars 83, and are spread out in substantially even layers thereon, the excess of fluid overflowing through overflow notches 88 in the upper edges of the track members 71 following the spreader bars 83, the overflow flowing into the trough 70 and passing therefrom through drain piping such as indicated at 90.

It is preferable to have the film which is being treated in as near horizontal position as possible so that layers of treating solution may be easily floated thereon, but in the practice of the invention good results may be obtained where the film is considerably sloped.

In both forms of our invention herein disclosed, the strips 18 and 71 which guide the films are so placed that very small spaces are left between the edges of the films and the strips. These spaces act as capillaries for holding at the edges of the films the overflowing fluid which runs down the side walls of the strips into the tanks 11 and 7. In the preferred form of our invention we show the films supported on the upper faces 21 of the blocks 20, which blocks are positioned under the distributing and spreader members 25. As clearly shown in Fig. 3, the blocks 20 do not extend entirely across the lower extremities of the sprocket holes 95 of the films; therefore, these sprocket holes are open to a drainage flow of fluid from the upper surface of the film during the time the sprocket holes are passing over the supports as well as during the time the sprocket holes are moving between supports. The supports 20 are placed at such distance apart that a relatively small tension on the film will hold the film substantially horizontal.

In the form of the invention shown in Figs. 5, 6, and 7, the supporting strips are rabbeted throughout their entire length so that the edges of the films are supported continuously. It will be noted, however, that in this form of the invention also the lower extremities of the sprocket holes are not covered so that fluid may flow through the sprocket holes into engagement with the supporting surfaces, this fluid then flowing down the inner faces of the supporting strips 71 without any tendency to flow inwardly across the lower faces of the films.

Although we have herein shown and described our invention in simple and practical form, it is recognized that certain parts or elements thereof are representative of other parts, elements, or mechanisms which may be employed in substantially the same manner to accomplish substantially the same results; therefore, it is to be understood that the invention is not to be limited to the details disclosed herein but is to be accorded the full scope of the following claims.

We claim as our invention:

1. A method of the character described for treating motion picture film having photographic images on both sides thereof, comprising: supporting the film in a substantially horizontal position; and spreading a layer of solution over the upper face of said film, while preventing said solution from contacting the images on the lower face of said film.

2. A method of the character described for treating motion picture film having photographic images on both sides thereof, comprising: supporting the film in such position that the side thereof to be treated is faced upwardly; applying solution to the upwardly faced side of said film; preventing said solution from flowing onto the under side of said film; and spreading said solution so as to form a substantially evenly distributed layer upon said upwardly faced side of said film.

3. A method of the character described for treating motion picture film having photographic images on both sides thereof, comprising: moving the film longitudinally in such position that the side thereof to be treated is faced upwardly; applying solution to the upwardly faced side of said film in such a manner as not to allow said solution to reach the under side of said film; and spreading said solution so as to form a substantially evenly distributed layer on said upwardly faced side of said film.

4. A film treating device of the character described, including: means for moving a film having photographic images on both sides thereof with the side to be treated facing upwardly; and means for applying a layer of treating fluid over the upwardly faced side of said film without allowing said fluid to contact the images on the under side of said film.

5. A film treating device of the character described, including: means for supporting a film having photographic images on both sides thereof with the side thereof to be treated facing upwardly; means for applying fluid to the upwardly faced side of said film; means for spreading said fluid in a substantially even layer over said upwardly faced side of said film; and means for preventing said fluid from reaching the images on the under side of said film.

6. A film treating device of the character described, including: track means for supporting a film with images on both sides thereof so that it may be moved in a substantially horizontal plane said track means being adapted to support said film without touching the images on the lower side thereof; a horizontal tubular member extending laterally across said track means in such position that the lower face of said tubular member will serve as a spreader for fluid applied to the film, there being a plurality of openings in said tubular member for delivering fluid to the upper face of said film; and means for delivering a controlled flow of fluid to said tubular member.

7. A method of applying a treating solution to a double emulsion perforated motion picture film, having images recorded in the emulsions on the opposite sides thereof, in such a manner that only the upper side thereof will be treated, said method including the steps of: moving said film with the surface to be treated facing in an upward direction; providing drain spaces along the side of said film; and delivering a treating solution to said upwardly facing surface to contact and treat same, said treating solution flowing from said upwardly facing surface through said drain spaces without contacting the lower surface of said film.

8. A method of applying a treating solution to a double emulsion perforated motion picture film, having images recorded in the emulsions on the opposite sides thereof, in such a manner that only the upper side thereof will be treated, said method including the steps of: moving said film with the surface to be treated facing in an upward direction; delivering a treating solution to said upwardly facing surface to contact and treat same; and withdrawing said treating solution from said upwardly facing surface downwardly through perforations of said film without the treating solution contacting the recorded images on the lower surface of said film.

9. A method of applying a treating solution to a double emulsion perforated motion picture film, having images recorded in the emulsions on the opposite sides thereof, in such a manner that only the upper side thereof will be treated, said method including the steps of: moving said film with the surface to be treated facing in an upward direction; delivering a treating solution to said upwardly facing surface to contact and treat same; and withdrawing said treating solution from said upwardly facing surface downwardly through perforations of said film and around the side edges of said film without the treating solution contacting the recorded images on the lower surface of said film.

10. A method of applying a treating solution to a double emulsion perforated motion picture film, having images recorded in the emulsions on the opposite sides thereof, in such a manner that only the upper side thereof will be treated, said method including the steps of: moving said film with the surface to be treated facing in an upward direction; delivering a treating solution to said upwardly facing surface to contact and treat same; spreading said treating solution over said upwardly facing surface; and withdrawing said treating solution from said upwardly facing surface downwardly through perforations of said film without the treating solution contacting the recorded images on the lower surface of said film.

11. A method of applying a treating solution to a double emulsion perforated motion picture film, having images recorded in the emulsions on the opposite sides thereof, in such a manner that only the upper side thereof will be treated, said method including the steps of: moving said film with the surface to be treated facing in an upward direction; delivering a treating solution to said upwardly facing surface to contact and treat same; spreading said treating solution over said upwardly facing surface; and withdrawing said treating solution from said upwardly facing surface downwardly through perforations of said film and around the side edges of said film without the treating solution contacting the recorded images on the lower surface of said film.

12. A method of applying an image-coloring solution to a double emulsion perforated motion picture film, having images recorded in the emulsions on the opposite sides thereof in order to color the images on one side of said film, in such a manner that only the upper side thereof will be image-colored, said metohd including the steps of: moving said film with the surface to be image-colored facing in an upward direction; providing drain spaces along the side of said film; and delivering an image-coloring solution to said upwardly facing surface to contact and image-color same, said image-coloring solution flowing from said upwardly facing surface through said drain spaces without contacting the lower surface of said film.

13. A method of applying an image-coloring solution to a double emulsion perforated motion picture film, having images recorded in the emulsions on the opposite sides thereof in order to color the images on one side of said film, in such a manner that only the upper side thereof will be image-colored, said method including the steps of: moving said film with the surface to be image-colored facing in an upward direction; delivering an image-coloring solution to said upwardly facing surface to contact and image-color same; and withdrawing said image-coloring solution from said upwardly facing surface downwardly through perforations of said film without the image-coloring solution contacting the recorded images on the lower surface of said film.

14. A method of applying an image-coloring solution to a double emulsion perforated motion picture film, having images recorded in the emulsions on the opposite sides thereof in order to color the images on one side of said film, in such a manner that only the upper side thereof will be image-colored, said method including the steps of: moving said film with the surface to be image-colored facing in an upward direction; delivering an image-coloring solution to said upwardly facing surface to contact and image-color same; spreading said image-coloring solution over said upwardly facing surface; and withdrawing said image-coloring solution from said upwardly facing surface downwardly through perforations of said film without the image-coloring solution contacting the recorded images on the lower surface of said film.

15. A method of treating a motion picture film having photographic images on both sides thereof comprising: Moving the film longitudinally in a substantially horizontal position; applying a treating solution to the upper face of said film while preventing said treating solution from contacting the images on the lower face of said film.

16. A method of treating a motion picture film having photographic images on both sides thereof comprising: Moving the film longitudinally in a substantially horizontal position; applying a treating solution to the upper face of said film; and drawing the excess treating solution from said upper face without allowing it to contact the images on the lower face of said film.

17. A film treating device of the character described including: means for moving a motion picture film with the side to be treated facing upwardly; means for applying a treating fluid to the upwardly facing side of said film and preventing said fluid from affecting the downwardly facing side of said film; and means for spreading said fluid in a substantially even layer over said upwardly facing side of said film.

18. A film treating device of the character described which includes: guide means for supporting a motion picture film having photographic images on both sides thereof; means for moving said film across and along said guide means in a substantially flat position; means for applying a treating fluid to the images on the upper side of said film; and means for withdrawing the excess treating fluid from said upper side of said film without allowing said fluid to reach the images on the lower side of said film.

19. A film treating device of the character described which includes: means for supporting and guiding a motion picture film having a series of perforations along each edge thereof, said supporting and guiding means only partially covering said perforations in said film; means for moving said film along said guiding and supporting means; and means for applying a treating fluid to the upper face of said film to uniformly cover the same.

20. A film treating device of the character described which includes: means for supporting a motion picture film having photographic images on each face thereof and a series of perforations along each edge thereof, said supporting means being adapted to contact said film along each edge of said film and support the same without entirely covering said perforations; motivating means for moving said film over said supporting means; and means for applying a treating fluid to the upper face of said film; and means for spreading said treating fluid entirely across the upper face of said film.

21. A film treating device of the character described which includes: longitudinal track members spaced apart in substantially parallel relationship a distance sufficient to allow a motion picture film having a series of perforations along each edge thereof to be drawn therealong without said perforations being entirely covered by said track members; means for moving said film along said track members; means for applying fluid to the upper face of said film; and means for spreading said fluid in a substantially even layer over said upper face.

WILLIAM T. CRESPINEL.
CHARLES W. PRYNNE.